(12) United States Patent  
Langenberg et al.

(10) Patent No.: US 11,560,745 B2  
(45) Date of Patent: *Jan. 24, 2023

(54) DOOR CLOSER DIAGNOSTICS SYSTEM

(71) Applicant: Schlage Lock Company LLC, Carmel, IN (US)

(72) Inventors: Daniel Langenberg, Zionsville, IN (US); Nathanael L. Thomas, Carmel, IN (US); Dakoda Johnson, Carmel, IN (US); William Jones, Fishers, IN (US); Nicholas Richardson, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/203,240

(22) Filed: Mar. 16, 2021

(65) Prior Publication Data

US 2022/0003030 A1 Jan. 6, 2022

Related U.S. Application Data

(62) Division of application No. 16/124,849, filed on Sep. 7, 2018, now Pat. No. 10,947,764.

(Continued)

(51) Int. Cl.
*E05F 1/10* (2006.01)
*E05F 7/00* (2006.01)
*E05F 3/04* (2006.01)

(52) U.S. Cl.
CPC .............. *E05F 1/10* (2013.01); *E05F 3/04* (2013.01); *E05F 7/00* (2013.01); *E05Y 2600/56* (2013.01);

(Continued)

(58) Field of Classification Search
CPC .............. E05F 1/10; E05Y 2900/132; G05B 2219/2628; G05B 2219/37526; G05B 2219/37627; G05B 2219/43114
See application file for complete search history.

(56) References Cited

U.S. PATENT DOCUMENTS 3,246,362 A 4/1966 Jackson
4,115,897 A 9/1978 Zunkel
(Continued)

FOREIGN PATENT DOCUMENTS

JP 2004132004 A 4/2004
WO 2011130638 A1 10/2011
WO 2016196583 A1 12/2016

OTHER PUBLICATIONS

ADA 404.2.8 (2010), available at https://up.codes/viewer/ada/chapter/4/accessible-routes#404.2.8 (Year: 2010).*

(Continued)

*Primary Examiner* — John C Kuan
(74) *Attorney, Agent, or Firm* — Taft Stettinius & Hollister LLP

(57) ABSTRACT

A door closer diagnostics system including a door closer, a server, and a mobile device having a display and at least one sensor. The mobile device is configured to (i) generate, by the at least one sensor, motion data indicative of motion of the door as the door is moved from an open position to a closed position, and (ii) transmit the motion data to the server. The server is configured to analyze the motion data to (i) determine a duration the door was in each of a plurality of door movement zones between the open and closed positions, (ii) determine at least one adjustment to the door closer for a successful installation of the door closer based on the duration the door was in each of the door movement zones, and (iii) transmit at least one installation instruction (Continued)

corresponding with the at least one adjustment to the mobile device.

17 Claims, 10 Drawing Sheets

Related U.S. Application Data

(60) Provisional application No. 62/556,004, filed on Sep. 8, 2017.

(52) U.S. Cl.
CPC . *E05Y 2900/132* (2013.01); *G05B 2219/2628* (2013.01); *G05B 2219/37526* (2013.01); *G05B 2219/37627* (2013.01); *G05B 2219/43114* (2013.01)

(56) References Cited

U.S. PATENT DOCUMENTS

| | | |
|---|---|---|
| 4,378,612 A | 4/1983 | Beers |
| 5,687,507 A | 11/1997 | Beran |
| 5,913,763 A | 6/1999 | Beran et al. |
| 6,397,430 B1 | 6/2002 | Brown et al. |
| 6,434,788 B1 | 8/2002 | Schulte |
| 8,415,902 B2 | 4/2013 | Burris et al. |
| 8,564,235 B2 | 10/2013 | Burris et al. |
| 8,773,237 B2 | 7/2014 | Burris et al. |
| 8,779,713 B2 | 7/2014 | Burris et al. |
| 2011/0252597 A1 | 10/2011 | Burris et al. |
| 2013/0086771 A1 | 4/2013 | Blockley |
| 2014/0182206 A1 | 7/2014 | Yulkowski et al. |
| 2015/0135601 A1 | 5/2015 | McKibben et al. |
| 2015/0262438 A1 | 9/2015 | Zasowski et al. |
| 2016/0024831 A1 | 1/2016 | Houser et al. |
| 2016/0348415 A1 | 12/2016 | Baumgarte |
| 2017/0198496 A1 | 7/2017 | Beck |
| 2017/0328108 A1 | 11/2017 | Long et al. |

OTHER PUBLICATIONS

Norton DoorControls, "How to properly adjust a Door Closer" YouTube video, Sep. 6, 2017, available at https://www.youtube.com/channel/UCWXZwKwvJuXslknNTv9Nh4g (Year: 2017).*

Norton DoorControls, "How to properly adjust a Door Closer" YouTube video, Sep. 6, 2017, available at https://www.youtube.com/watch?v=GWOd31MQJnU (Year: 2017).*

Mahler et al., "SecureHouse: A Home Security System Based on Smartphone Sensors" 2017 IEEE International Conference on Pervasive Computing and Communications (PerCom), Mar. 2017 (Year 2017).

International Search Report; International Searching Authority; International Patent Application No. PCT/US2018/050251; dated Dec. 11, 2018; 2 pages.

Written Opinion; International Searching Authority; International Patent Application No. PCT/US2018/050251; dated Dec. 11, 2018; 6 pages.

Frank et al.; "Mounted Smartphones as Measurement and Control Platforms for Motor-Based Laboratory Test-Beds" Sensors; 2016; 25 pages; vol. 16 No. 1331; www.mdpi.com/journal/sensors.

* cited by examiner

DOOR CLOSER DIAGNOSTICS SYSTEM

CROSS-REFERENCE TO RELATED APPLICATIONS

The present application is a continuation of U.S. patent application Ser. No. 16/124,849 filed Sep. 7, 2018 and issued as U.S. Pat. No. 10,947,764, which claims the benefit of U.S. Provisional Patent Application No. 62/556,004 filed Sep. 8, 2017, the contents of each application hereby incorporated by reference in their entirety.

BACKGROUND

Installation of hydraulic door closers is typically a manual process that results in a sub-optimal setup. In general, door closers are adjusted to ensure the door closes as desired and the operation complies with any relevant requirements (e.g., ADA requirements, building management or architect requirements, etc.). Proper adjustment of a door closer may be a daunting task, particularly for untrained installers. The door closer may include multiple adjustment points that have similar behaviors (e.g., increasing/decreasing the speed of the door), which complicates making the proper adjustments. Further, a contractor will oftentimes install the door closer and, if the door opens and shuts, move on to the next job. In such cases, adjustment of the door closer is typically left for a maintenance person, who may rely on trial and error (e.g., through many iterations of adjustment) and/or years of experience to fine-tune the operation of the door closer. However, the door closer operation may still be sub-optimal.

SUMMARY

According to one aspect, a method may include generating, by at least one sensor, motion data indicative of motion of a door having a door closer as the door is moved from an open position to a closed position, analyzing the motion data to determine a duration the door was in each of a plurality of door movement zones between the open position and the closed position, determining at least one adjustment to the door closer for a successful installation of the door closer based on the duration the door was in each of the plurality of door movement zones, and displaying at least one installation instruction corresponding with the at least one adjustment on a graphical user interface of a mobile device.

In some embodiments, the mobile device may be coupled to the door, and generating the motion data may include generating the motion data based on at least one sensor of the mobile device. In some embodiments, analyzing the motion data may include transmitting the motion data from the mobile device to a server and analyzing the motion data by the server to determine the duration the door was in each of the plurality of door movement zones, and determining the at least one adjustment to the door closer may include determining the at least one adjustment by the server.

In some embodiments, the method may further include displaying, on the graphical user interface of the mobile device, a notification indicative of a successful installation of the door closer in response to a determination that no adjustments to the door closer are necessary for a successful installation of the door closer. In some embodiments, determining the at least one adjustment may include determining an adjustment to a main valve of the door closer, determining an adjustment to a latch valve of the door closer, and/or determining an adjustment to a spring of the door closer.

In some embodiments, the plurality of door movement zones may include a main zone and a latch zone, determining the at least one adjustment to the door closer may include determining to loosen a main valve of the door closer in response to determining the duration the door was in the main zone is greater than a first threshold time, and determining the at least one adjustment to the door closer may include determining to tighten the main valve in response to determining the duration the door was in the main zone is less than a second threshold time, wherein the first threshold time is greater than the second threshold time. Further, in some embodiments, determining the at least one adjustment to the door closer may include determining to loosen a latch valve of the door closer in response to determining the duration the door was in the latch zone is greater than a third threshold time, and determining the at least one adjustment to the door closer may include determining to tighten the latch valve in response to determining the duration the door was in the latch zone is less than a fourth threshold time, wherein each of the third threshold time and the fourth threshold time is based on the duration the door was in the main zone. Further, each of the third threshold time and the fourth threshold time may be proportional to the duration the door was in the main zone.

In some embodiments, determining the at least one adjustment to the door closer may include determining to at least one of loosen the main valve or tighten a spring of the door closer in response to determining the door does not move from the open position to the closed position in less than a fifth threshold time, wherein the fifth threshold time is greater than the first threshold time. In some embodiments, determining the at least one adjustment to the door closer may include determining the at least one adjustment to the door closer based on at least one user-selected installation setting for the door closer.

According to another aspect, a door closer diagnostics system may include a door closer secured to a door, a server, and a mobile device. The mobile device may include a display and at least one sensor and may be configured to generate, by the at least one sensor, motion data indicative of motion of the door as the door is moved from an open position to a closed position and transmit the motion data to the server. The server may be configured to analyze the motion data to determine a duration the door was in each of a plurality of door movement zones between the open position and the closed position, determine at least one adjustment to the door closer for a successful installation of the door closer based on the duration the door was in each of the plurality of door movement zones, and transmit at least one installation instruction corresponding with the at least one adjustment to the mobile device. The mobile device may be further configured to display the at least one installation instruction on a graphical user interface.

In some embodiments, the at least one sensor comprises a gyrometer. In some embodiments, the mobile device is mounted to the door closer or the door. In some embodiments, the door closer may include a main valve, a latch valve, and a spring adjustment screw, and the at least one adjustment may include an adjustment to at least one of the main valve, the latch valve, or the spring adjustment screw.

According to yet another embodiment, a method may include mounting a mobile device to a door closer operably secured to a door, launching an application on the mobile device to record motion data indicative of motion of the door generated by at least one sensor of the mobile device, opening the door to an open position, releasing the door from the open position, and adjusting the door closer based on at least one installation instruction provided by the application in response to an analysis of the motion data generated as the door moved from the open position to a closed position.

In some embodiments, the open position may be ninety degrees from the closed position. In some embodiments, adjusting the door closer may include adjusting at least one of a main valve of the door closer, a latch valve of the door closer, or a spring of the door closer.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
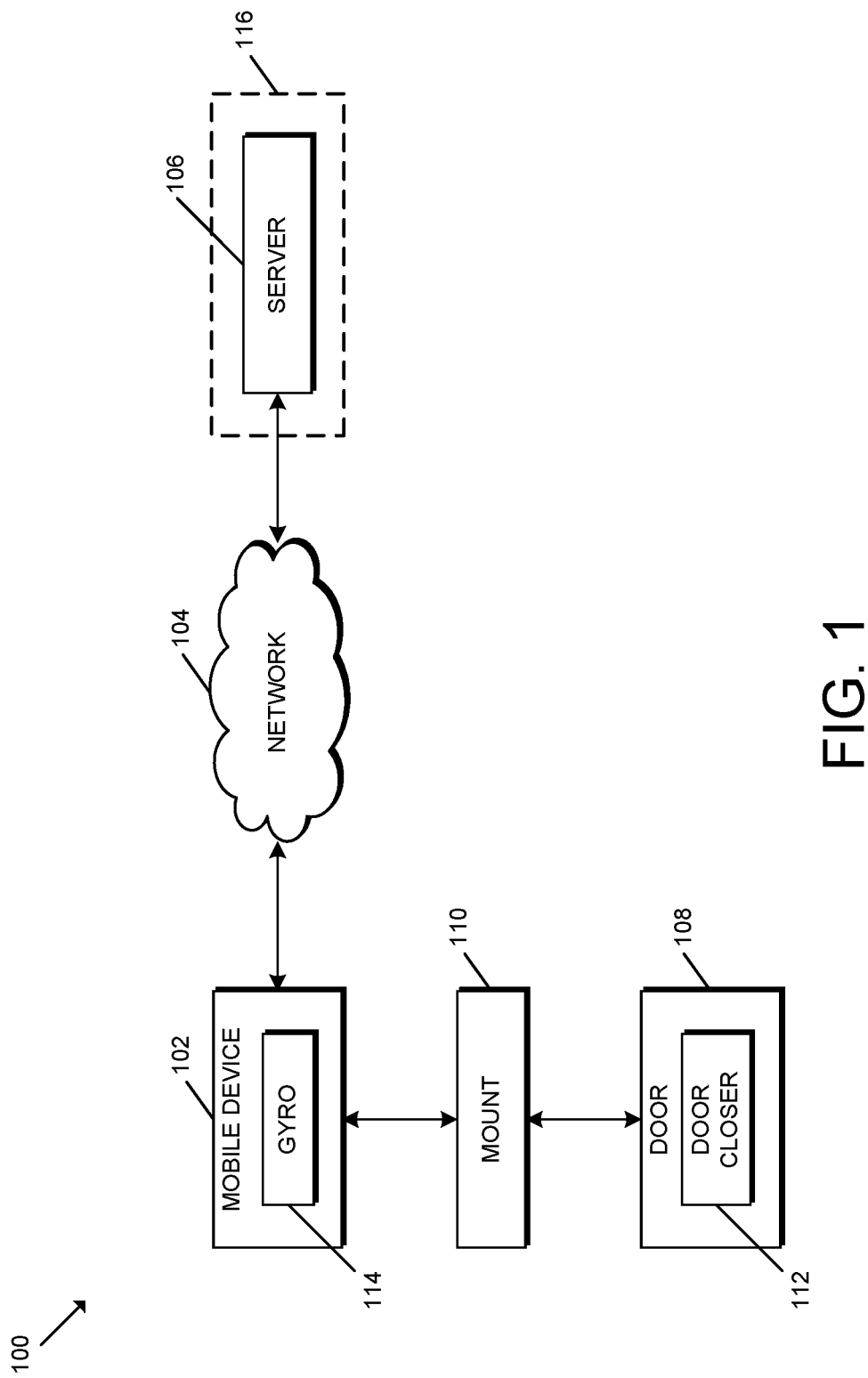
FIG. 1 is a simplified block diagram of at least one embodiment of a door closer diagnostics system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature.

Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a door closer diagnostics system 100 includes a mobile device 102, a network 104, a server 106, a door 108, and a mount 110. In the illustrative embodiment, the mobile device 102 is secured to the door 108 or a component thereof with the mount 110. For example, in some embodiments, the mobile device 102 may be mounted to the door closer 112 itself. Accordingly, it should be appreciated that the movement of the mobile device 102 is indicative of movement of the door 108.

As described in detail below, in the illustrative embodiment, one or more sensors of the mobile device 102 generate motion data, which is indicative of motion of the door 108 as the door 108 closes from an open position to a closed position. For example, as shown in FIG. 1, the illustrative mobile device 102 includes a gyrometer 114 that measures the angular velocity of the mobile device 102 and, therefore, the angular velocity of the door 108 during its movement. Further, the mobile device 102 transmits the motion data to the server 106, which analyzes the motion data to determine whether the door closer 112 has been successfully installed (e.g., properly adjusted) based on the duration the door 108 was in each door movement zone/region between the open position and the closed position. In particular, in some embodiments, the approximate door angle may be determined based on the angular velocity data (e.g., by integrating the angular velocity of the door 108), and the duration the door was in each region/zone of the door closing may be determined, for example, based on the internal time and sampling rate of the angular velocity. If not successfully installed, the server 106 may determine one or more adjustments to the door closer 112 based on the door movement zone durations and transmit installation instructions corresponding with such adjustments to the mobile device 102 for display on a graphical user interface. In particular, in the illustrative embodiment, the graphical user interface may display an image of the door closer 112 and specifically identify the component(s) of the door closer 112 to adjust and/or an amount of the adjustment. It should be appreciated that, by providing specific and objective installation instructions, the number of steps/iterations required to achieve a proper installation may be significantly reduced.

In the illustrative embodiment, the mobile device 102 may communicate with the server 106 over any suitable network 104. The network 104 may be embodied as any type of communication network or connection(s) capable of facilitating communication between the mobile device 102 and remote devices (e.g., the server 106). As such, the network 104 may include one or more networks, routers, switches, computers, and/or other intervening devices. For example, the network 104 may be embodied as or otherwise include one or more cellular networks, telecommunication networks, local or wide area networks, publicly available global networks (e.g., the Internet), ad hoc networks, short-range communication links, or a combination thereof.

In some embodiments, the server 106 may be embodied as a cloud-based device or collection of devices within a cloud environment 116. In such embodiments, it should be appreciated that the server 106 may be embodied as a "serverless" or server-ambiguous computing solution, for example, that executes a plurality of instructions on-demand, contains logic to execute instructions only when prompted by a particular activity/trigger, and does not consume computing resources when not in use. That is, the server 106 may be embodied as a virtual computing environment residing "on" a computing system (e.g., a distributed network of devices) in which various virtual functions (e.g., Lamba functions, Azure functions, Google cloud functions, and/or other suitable virtual functions) may be executed corresponding with the functions of the server 106 described herein. For example, when an event occurs, the application may contact the virtual computing environment (e.g., via an HTTPS request to an API of the virtual computing environment), whereby the API may route the request to the correct virtual function (e.g., a particular server-ambiguous computing resource) based on a set of rules.

It should be appreciated that each of the mobile device 102 and the server 106 may be embodied as a computing device similar to the computing device 200 described below in reference to FIG. 2. For example, in the illustrative embodiment, each of the mobile device 102 and the server 106 includes a processing device 202 and a memory 206 having stored thereon operating logic 208 for execution by the processing device 202 for operation of the corresponding device.

The mount 110 used to secure the mobile device 102 to the door 108, the door closer 112, or another component also secured to the door 108 (e.g., a lock or exit device) may be any mechanism suitable for securing the mobile device 102 such that motion of the mobile device 102 correlates with (e.g., is a suitable proxy for) the motion of the door 108. As such, in the illustrative embodiment, the mount 110 is a mechanism that ensures a rigid joinder of the mobile device 102 and the door 108. In some embodiments, it should be appreciated that the mobile device 102 may be held by the service technician against the door 108, the door closer 112, or another component secured to the door 108 without the use of a mount 110.

It should be appreciated that the door closer 112 may be embodied as any door closer suitable for the performance of the functions described herein. In some embodiments, the door closer may be embodied as an auto-operator or auto-equalizer device. Although the adjustments to the door closer 112 are described herein primarily in reference to a main valve, a latch valve, and a spring, it should be appreciated that other door closers 112 may include additional and/or alternative adjustment mechanisms that may be adjusted based on the techniques described herein. In various embodiments, the door closer 112 may include, for example, one or more backcheck position regulating valves, latch speed regulating valves, sweep speed regulating valves, delayed action closing regulating valves, staked valves, hydraulic adjustment valves, captured valves, and/or spring power adjustment mechanisms. Further, in some embodiments, the adjustment mechanisms may include electrical or electromechanical settings/mechanisms and/or software/firmware settings related to forces associated with the door closing.

Figure 13:
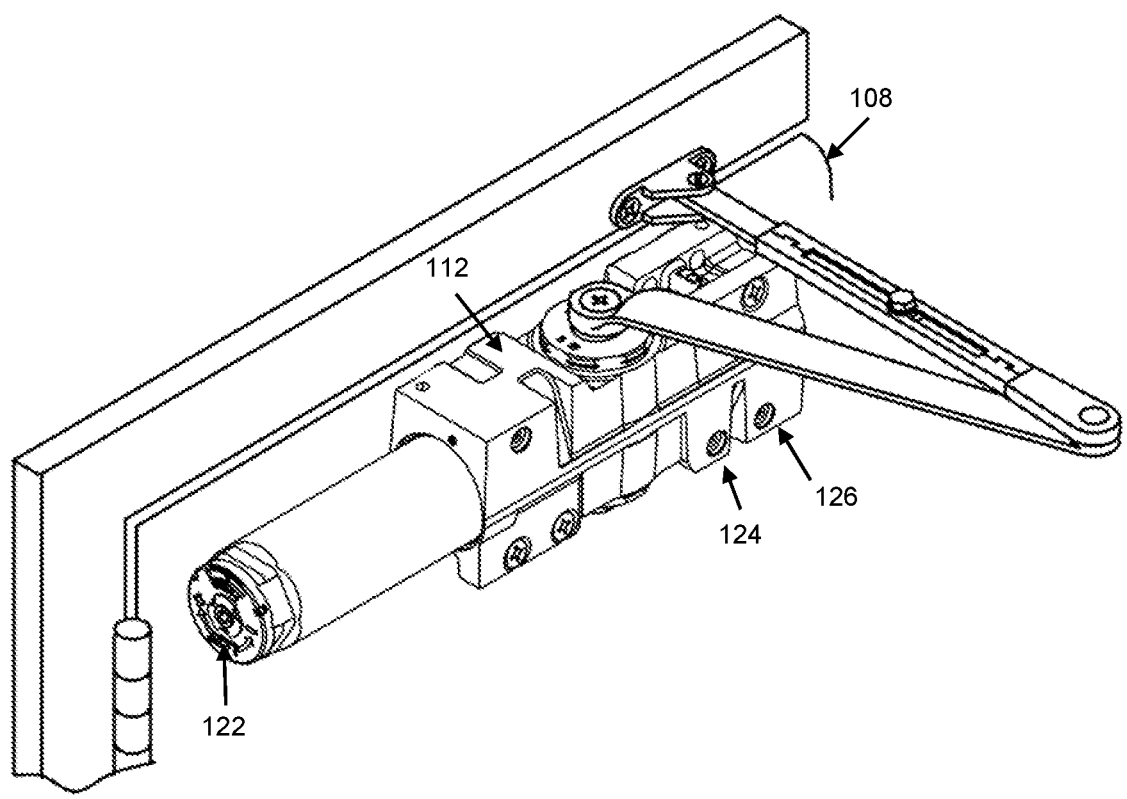
FIG. 13 is a perspective illustration of a door closer that may be utilized in connection with certain embodiments.

An example of a door closer 112 that may be utilized in connection with certain embodiments is illustrated in FIG. 13. The door closer 112 includes a spring adjustment screw 122 operable to tighten and loosen the internal spring of the closer 112 to adjust the closing force provided by the spring. The door closer 112 also includes a main valve 124, which modulates the flow of hydraulic fluid through a passage to reduce the movement speed of the door 108 in the main swing zone. The door closer 112 also includes a latch valve 126, which modulates the flow of hydraulic fluid through a passage to reduce the movement speed of the door 108 in the latch zone. Accordingly, the closing speed of the door 108 in each of the main zone and the latch zone, and thus the amount of time that the door spends in each of the main zone and the latch zone, can be adjusted by adjusting the spring adjustment screw 122, the main valve 124, and/or the latch valve 126.

Although only one mobile device 102, one network 104, and one server 106 are shown in the illustrative embodiment of FIG. 1, the door closer diagnostics system 100 may include multiple mobile devices 102, networks 104, and/or servers 106 in other embodiments. Further, in some embodiments, the mobile device 102 may be configured to perform one or more of the functions of the server 106. Accordingly, in such embodiments, the network 104 and the server 106 may be omitted from the door closer diagnostics system 100. Further, although the motion data is generated by one or more sensors of the mobile device 102 (e.g., a gyrometer) in the illustrative embodiment, it should be appreciated that the motion data may be generated by sensors of another component/device secured to the door 108 in other embodiments (e.g., the door closer 112, a lock device, an exit device, an embedded device, an access control device, and/or another device/component). In such embodiments, the motion data may be transmitted to the mobile device 102 and/or to the server 106 for further analysis (e.g., via a gateway device). Further, in such embodiments, the sensor-housing device may include an accelerometer, pushbutton, door position sensor, pushbar- or lever-actuated system, and/or another suitable mechanism to wake the device to determine whether to begin recording, for example, with a gyrometer. In some embodiments, the device may be awaken by a transmission from the mobile device 102 in response to user input via the application to begin recording the motion data. In some embodiments, the sensor(s) may be permanently installed on the door 108, or a component thereof, and the motion data and/or required/recommended adjustments may be transmitted to the server 106, which may be analyzed remotely to determine, for example, whether to notify a service technician (e.g., automatically via email).

Figure 2:
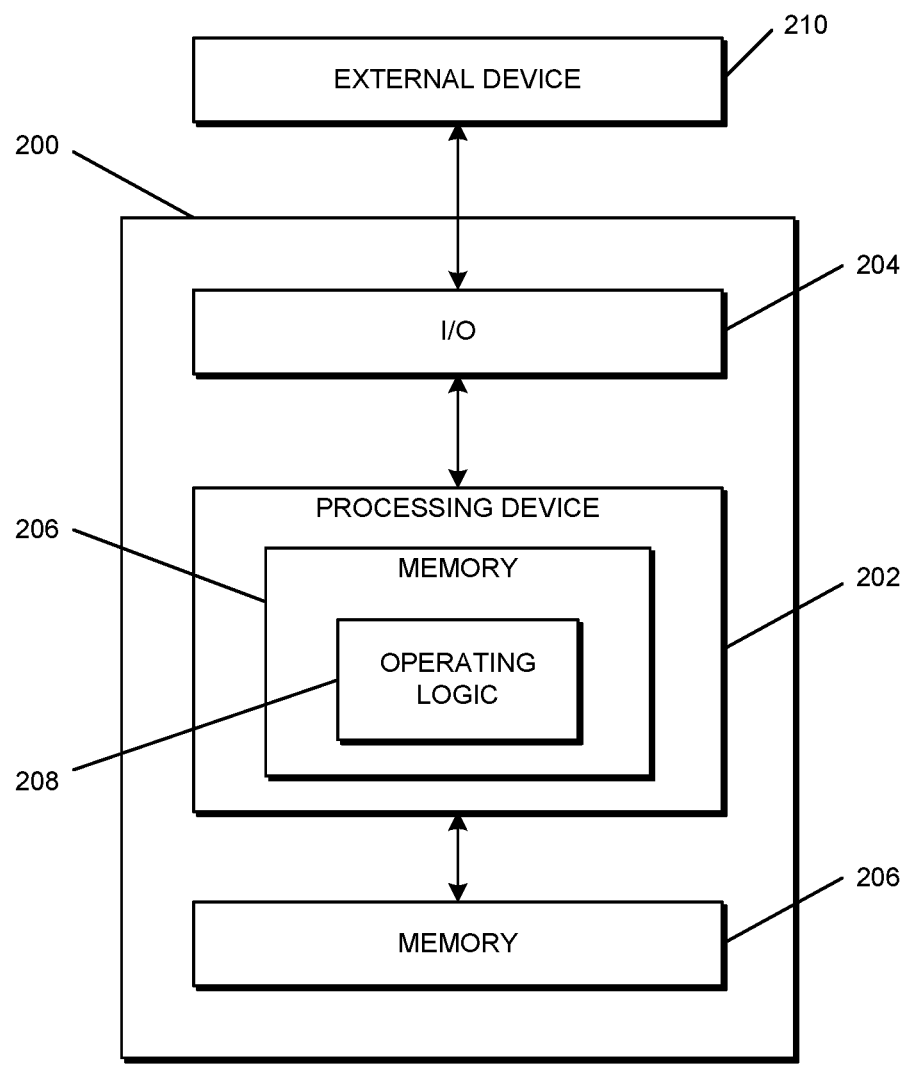
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of a mobile device and/or server that may be utilized in connection with the mobile device 102 and/or the server 106 illustrated in FIG. 1. Depending on the particular embodiment, computing device 200 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the mobile device 102 and/or the server 106. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
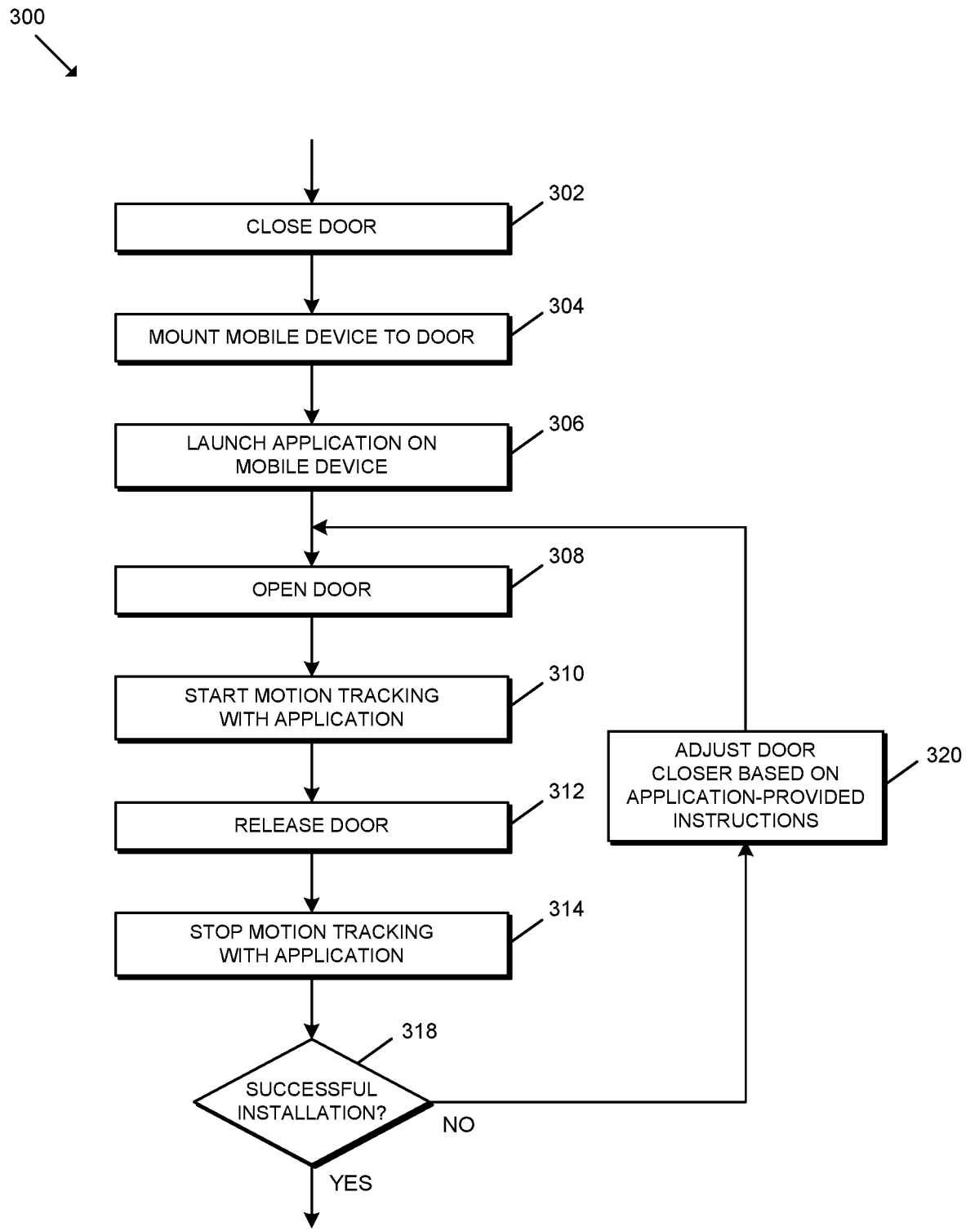
FIG. 3 is a simplified flow diagram of at least one embodiment of a method for installing a door closer using the door closer diagnostics system of FIG. 1.
Figure 7:
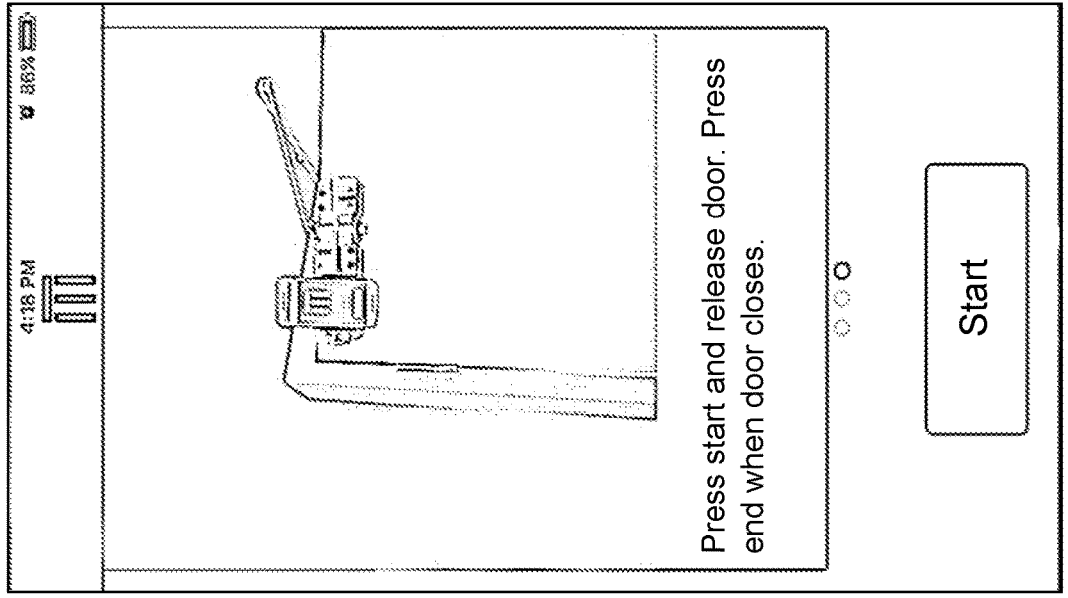
FIGS. 7-11 illustrate screen captures of at least one embodiment of a graphical user interface of a mobile device of FIG. 1.

Referring now to FIG. 3, a service technician may execute a method 300 for installing a door closer 112 using the door closer diagnostics system 100. As described herein, the service technician may rely on an application executing on the mobile device 102 to provide the technician with step-by-step instructions for installing and adjusting the door closer 112. It should be appreciated that the particular blocks of the method 300 are illustrated by way of example, and such blocks may be combined or divided, added or removed, and/or reordered in whole or in part depending on the particular embodiment, unless stated to the contrary. The illustrative method 300 begins with block 302 in which the service technician closes the door 108. In block 304, the technician mounts the mobile device 102 to the door 108. As described above, the mobile device 102 may be mounted to the door 108, to the door closer 112, or to another component or device secured to the door 108 depending on the particular embodiment. In block 306, the technician launches the application on the mobile device 102. Although the application is described herein as being launched after the mobile device 102 has been secured to the door 108, it should be appreciated that the application may be launched before securing the mobile device 102 to the door 108 in other embodiments. For example, in some embodiments, the application may instruct the technician to mount the mobile device 102 to the door 108 as depicted in the screen capture 700 of FIG. 7.

Figure 8:
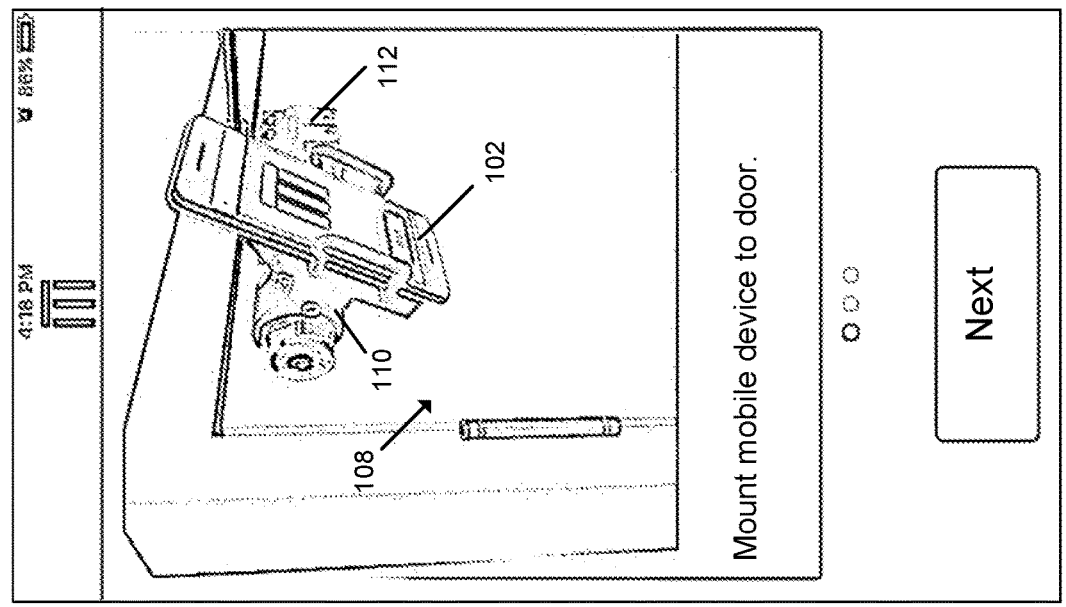

In block 308, the technician opens the door 108. In particular, in the illustrative embodiment, the door 108 is opened to ninety degrees (or approximately ninety degrees) from the closed position. In other embodiments, it should be appreciated that the door may be opened to another threshold distance suitable for ascertaining sufficient motion data for performing the functions described herein. In block 310, the technician provides user input to the application via the graphical user interface to start motion tracking (e.g., generating/recording the motion data) and, in block 312, the technician releases the door 108 to allow the door 108 to move from the open position to the closed position under the force of the door closer 112. In block 314, the technician provides user input to the application via the graphical user interface to stop motion tracking (e.g., when the door 108 comes to the closed position). As shown in the screen capture 800 of FIG. 8, in some embodiments, the application may instruct the technician to press the start button on the graphical user interface, release the door 108, and press an end button on the graphical user interface when the door 108 comes to the closed position.

In block 318, the technician determines whether the door closer 112 has been successfully installed and adjusted based on feedback from the application via the graphical user interface. For example, as shown in the screen captures 900, 1000, 1100 of FIGS. 9-11, if the door closer 112 has not been adjusted properly, the mobile device 102 may provide further installation instructions for the technician via the graphical user interface with graphics, text, and/or videos identifying the particular adjustment(s) to make. For example, the mobile device 102 may instruct the technician to adjust a main valve of the door closer 112 as shown in the screen capture 900 of FIG. 9, adjust a spring of the door closer 112 as shown in the screen capture 1000 of FIG. 10, and/or adjust a latch valve of the door closer 112 as shown in the screen capture 1100 of FIG. 11.

In some embodiments, it should be appreciated that the mobile device 102 may further instruct the technician regarding the amount by which to adjust the relevant component. For example, in some embodiments, the mobile device 102 may instruct the technician to adjust the main valve and latch valve by a half turn, a quarter turn, or an eighth turn. Similarly, the mobile device 102 may instruct the technician to adjust the spring, for example, by three turns. Further, in some embodiments, the amount of an adjustment to make may be based on a deviation (e.g., expressed as a ratio) of the duration in the various door movement zones from the target value(s). For example, the mobile device 102 may instruct the technician to make a greater adjustment when there is a greater deviation, and may instruct the technician to make a lesser adjustment when there is a lesser deviation. Although the adjustments to the door closer 112 are described herein primarily in reference to a main valve, latch valve, and spring of the door closer 112, it should be appreciated that the door closer 112 may include additional and/or alternative adjustment mechanisms depending on the particular type of door closer 112.

If the feedback from the application indicates that an adjustment to the door closer 112 is required, in block 320, the technician may adjust the door closer 112 based on the application-provided instructions. Further, the method 300 returns to block 308 in which the technician again utilizes the mobile device 102 to track the motion of the door 108 from an open position to a closed position for further analysis. It should be appreciated that the technician may be notified of the successful installation and adjustment of the door closer 112 via the application when no further adjustments are required.

Although the blocks 302-320 are described in a relatively serial manner, it should be appreciated that various blocks of the method 300 may be performed in parallel in some embodiments.

Figure 4:
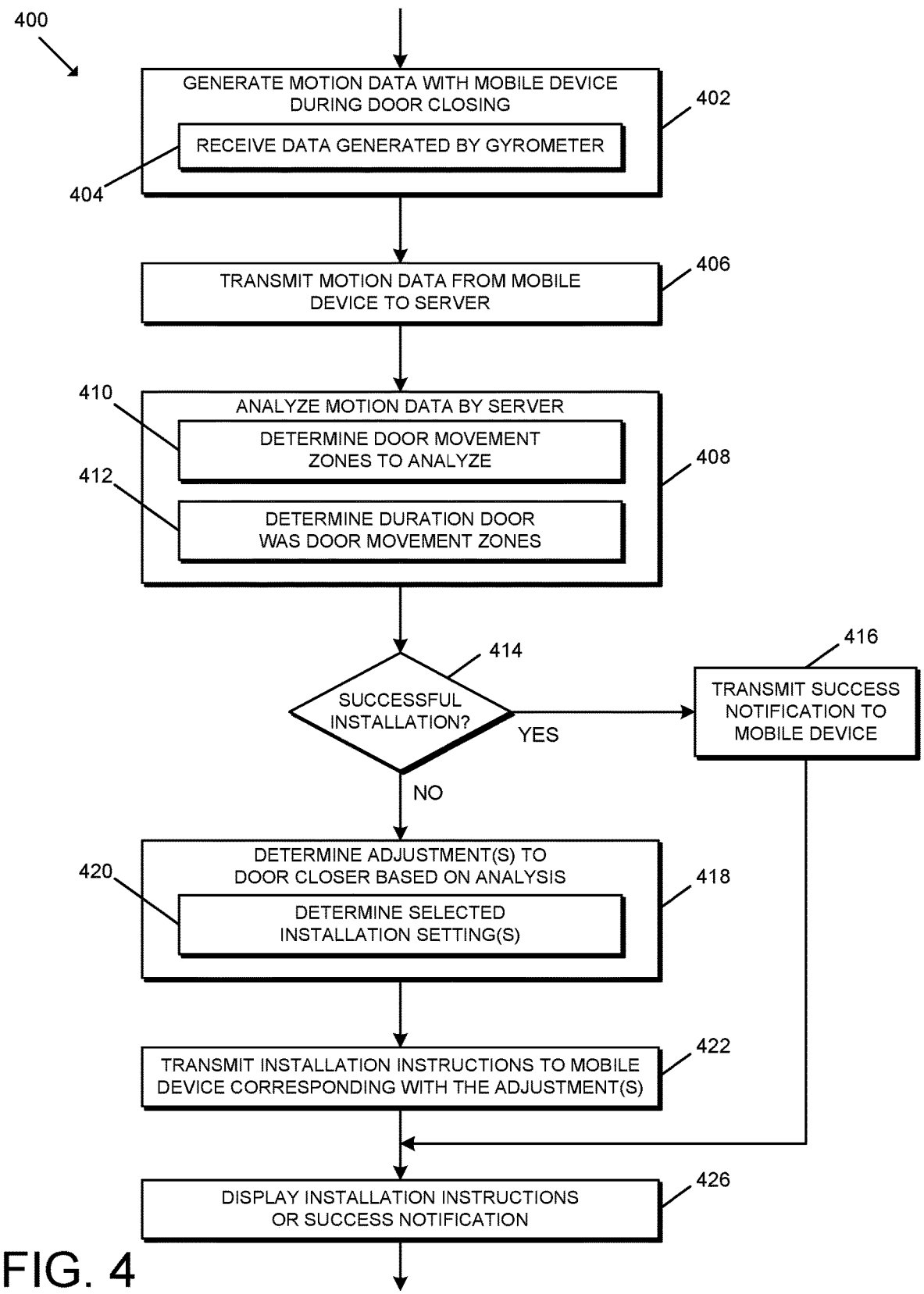
FIG. 4 is a simplified flow diagram of at least one embodiment of a method for adjusting a door closer using the door closer diagnostics system of FIG. 1.

Referring now to FIG. 4, in use, the door closer diagnostics system 100 may execute a method 400 for adjusting the door closer 112. It should be appreciated that the particular blocks of the method 400 are illustrated by way of example, and such blocks may be combined or divided, added or removed, and/or reordered in whole or in part depending on the particular embodiment, unless stated to the contrary. The illustrative method 400 begins with block 402 in which the mobile device 102 generates/senses motion data with one or more sensors of the mobile device 102. In particular, as described above, the mobile device 102 may receive/retrieve angular velocity data generated by a gyrometer 114 of the mobile device 102 in block 404. In block 406, the mobile device 102 transmits the motion data to the server 106 for analysis.

Figure 12:
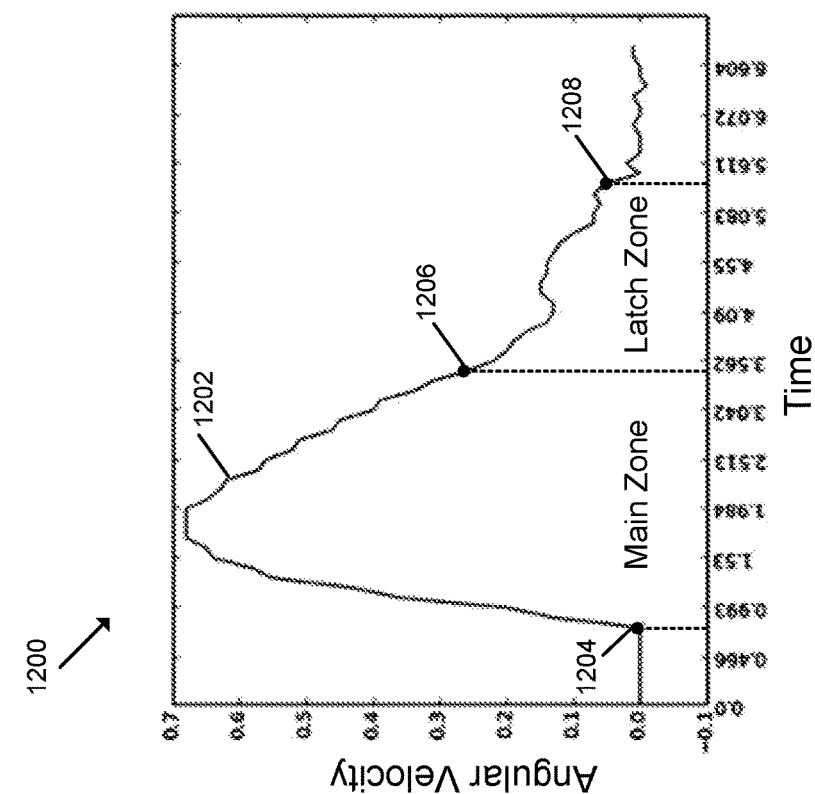
FIG. 12 is a graph illustrating at least one embodiment of motion data generated by a sensor of the door closer diagnostics system.

In block 408, the server 106 analyzes the motion data to determine whether the installation of the door closer 112 was successful (e.g., determining whether further adjustments are required). In particular, in block 410, the server 106 determines which door movement zones to analyze and, in block 412, the server 106 determines the duration the door 108 was in each of the door movement zones. For example, in some embodiments, time-based angular velocity measurements of the door 108 may be recorded for the door throughout the entire movement of the door 108 from the open position to the closed position (see, for example, graph 1200 of FIG. 12). The server 106 may segment that data based, for example, on the amplitude and/or direction of the movement. In particular, the server 106 may estimate the maximum angle or open position of the door 108 (e.g., by presuming the maximum angle or open position to be ninety degrees or by integrating the angular velocity data to approximate that angle) and segment the range of motion into a plurality of door movement zones. For example, in some embodiments, the range of motion may be segmented into a pre-closing zone, a main closing zone, a latch closing zone, and a post-closing zone. As such, the server 106 may determine the duration the door 108 was in each of the main zone and the latch zone. Although the analysis of the motion data is described herein as being performed by the server 106, it should be appreciated that the analysis may be performed by the mobile device 102 in other embodiments. As shown in the graph 1200 of FIG. 12, in some embodiments, the server 106 may analyze the angular velocity data 1202 generated by the gyrometer 114 to determine a set of reference points 1204, 1206, 1208 that define the various door movement zones in the range of motion of the door 108 (e.g., by integrating the angular velocity data 1202).

In some embodiments, it should be appreciated that the sensor(s) and/or the motion data generated therefrom may be normalized. More specifically, the relevant axes may be normalized such that they have the proper polarity and scale. For example, a right-handed door may see a positive velocity on the x-axis for a door opening and a negative velocity on the y-axis, but a left-handed device (which involves "flipping" the system upside-down) would have the velocities reversed. Further, it should be appreciated that a 12-bit gyrometer may provide different values than a 24-bit gyrometer and, therefore, the values may be scaled/normalized into a standard unit to allow the application to account for the variation in the hardware among mobile devices. Additionally, a device could be rotated in a sub-optimal orientation such that part of the acceleration occurs on the x-axis and part of the acceleration occurs on the y-axis; the data may be normalized to account for such variations in orientation.

In block 414, the server 106 determines whether the installation/adjustment was successful based on the analysis of the motion data. If successful, in block 416, the server 106 transmits a success notification to the mobile device 102 for display on the graphical user interface. However, if further adjustment(s) are required, the server 106 determines one or more adjustments to the door closer 112 based on the analysis of the motion data in block 418. In doing so, in block 418, the server 106 may determine one or more user-selected installation settings of the door closer 112 in block 420. For example, in some embodiments, the technician may input via the graphical user interface of the application one or more regulatory requirements, building management or architect requirements, and/or other relevant requirements. More specifically, in some embodiments, the technician may select from a plurality of predefined installation settings options. For example, a first option may have a 5 second close time with 2.5 seconds in the main zone and 2.5 seconds in the latch zone, a second option may have a 10 second close time with 5 seconds in the main zone and 5 seconds in the latch zone, and a third option may have a 9 second close time from 90 degrees to 15 degrees. As described above, in some embodiments, the adjustments may include loosening/tightening the main valve, latch valve, and/or spring of the door closer 112. It should be appreciated that, in some embodiments, blocks 414 and 418 may be performed contemporaneously.

In block 422, the server 106 transmits one or more installation instructions to the mobile device 102 corresponding with the required adjustment(s). In block 426, the mobile device 102 displays the installation instruction(s) or the success notification on the graphical user interface of the application for the technician. If an installation instruction is displayed, it should be appreciated that the technician is to perform the associated adjustment(s) and the method 400 may be re-executed after the completion of the adjustment(s) to determine whether any further adjustments are required.

Although the blocks 402-426 are described in a relatively serial manner, it should be appreciated that various blocks of the method 400 may be performed in parallel in some embodiments.

Figure 5:
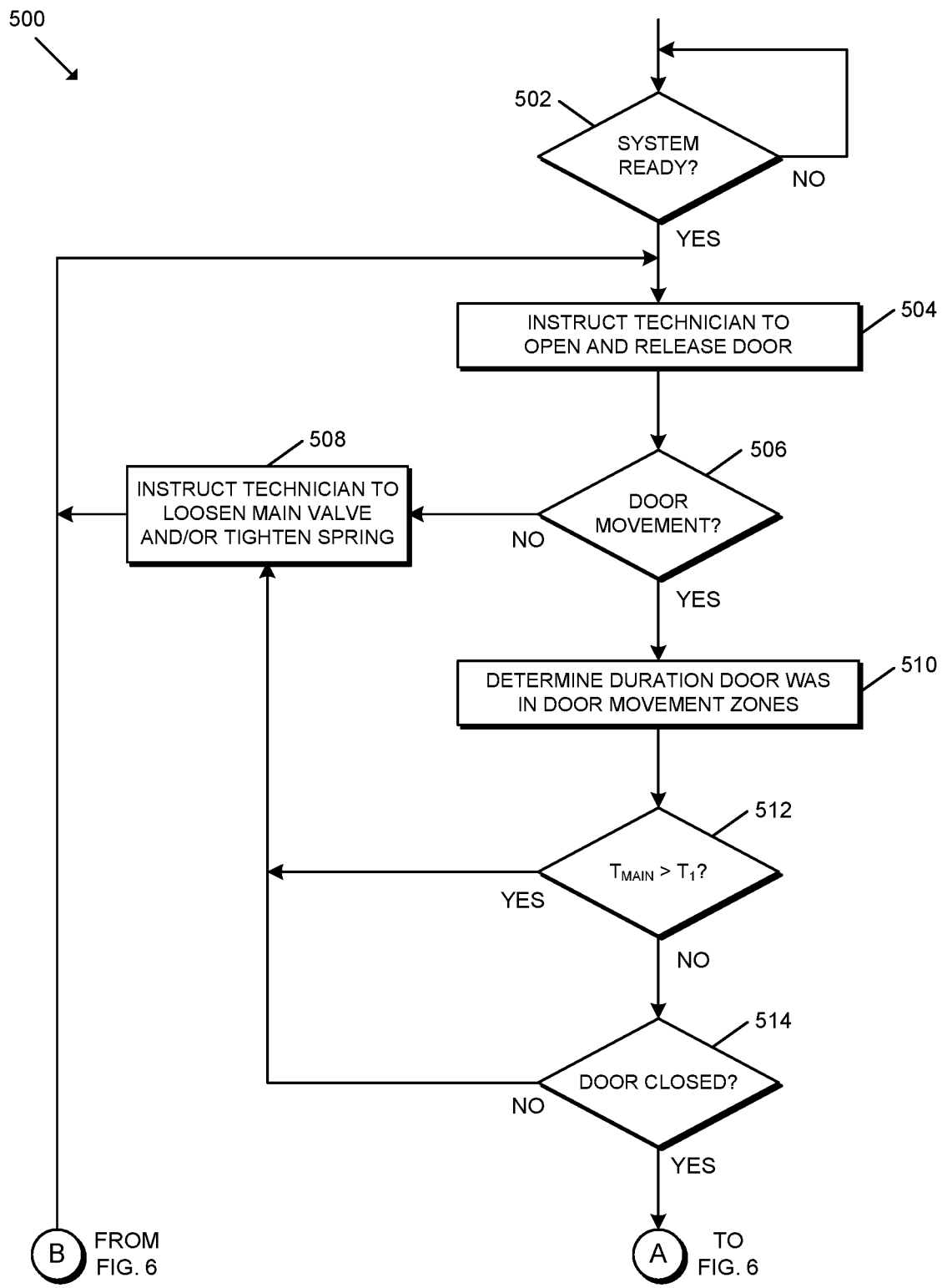
FIGS. 5-6 are a simplified flow diagram of at least one embodiment of a method for adjusting a door closer using the door closer diagnostics system of FIG. 1.
Figure 6:
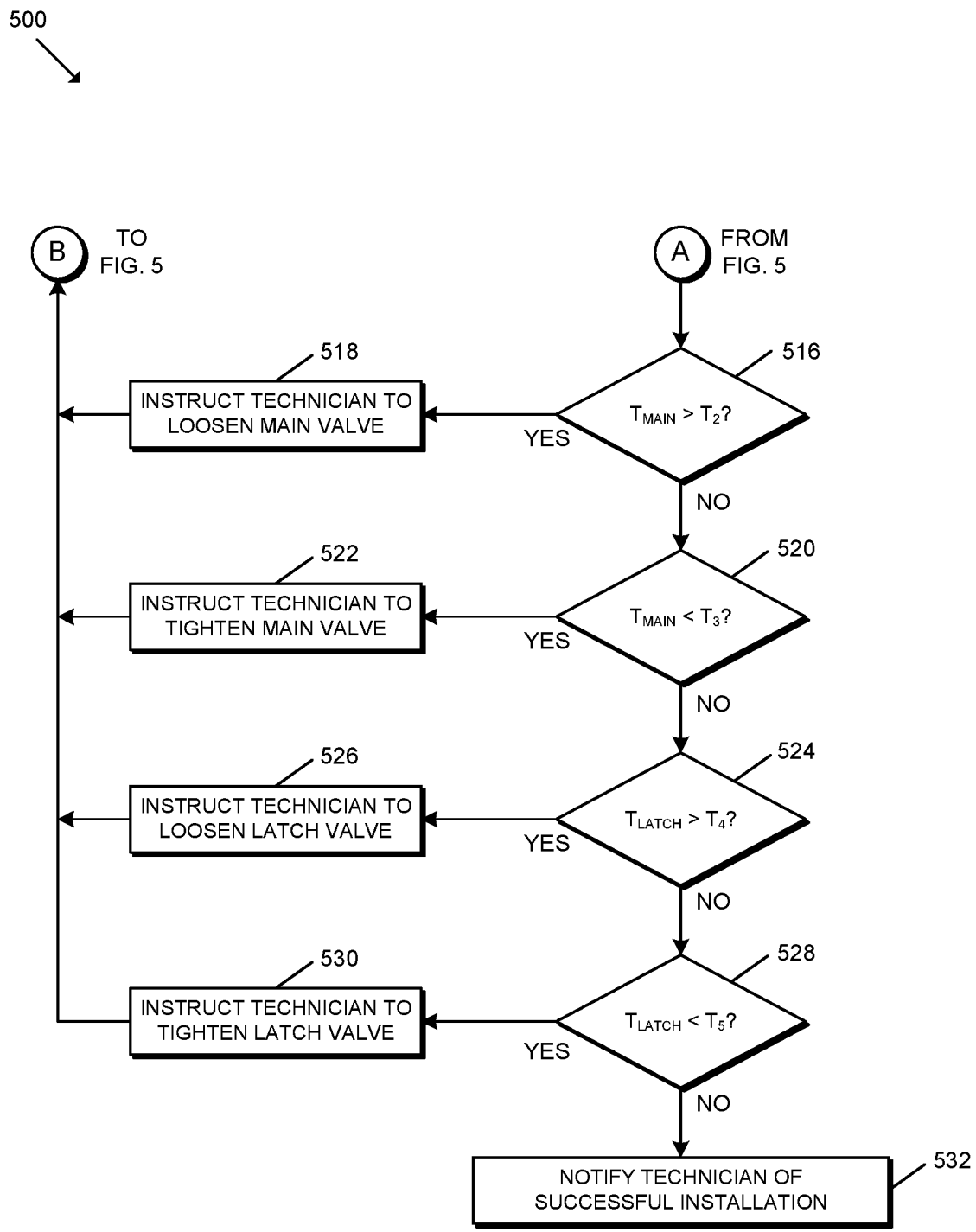

Referring now to FIGS. 5-6, in use, the door closer diagnostics system 100 may execute a method 500 for adjusting the door closer 112. It should be appreciated that the particular blocks of the method 500 are illustrated by way of example, and such blocks may be combined or divided, added or removed, and/or reordered in whole or in part depending on the particular embodiment, unless stated to the contrary. The illustrative method 500 begins with block 502 of FIG. 5 in which it is determined whether the door closer diagnostics system 100 is ready to determine whether the door closer 112 is properly/successfully installed. In particular, in the illustrative embodiments, it is determined whether the door 108 is closed with the mobile device 102 properly mounted to the door 108 and the application launched on the mobile device 102 for motion tracking. If so, the method 500 advances to block 504 in which the mobile device 102 instructs the technician to open the door 108 (e.g., to approximately 90 degrees) and release the door 108 (see, for example, screen capture 800 of FIG. 8) while the mobile device 102 records the motion data of the door 108.

Figure 10:
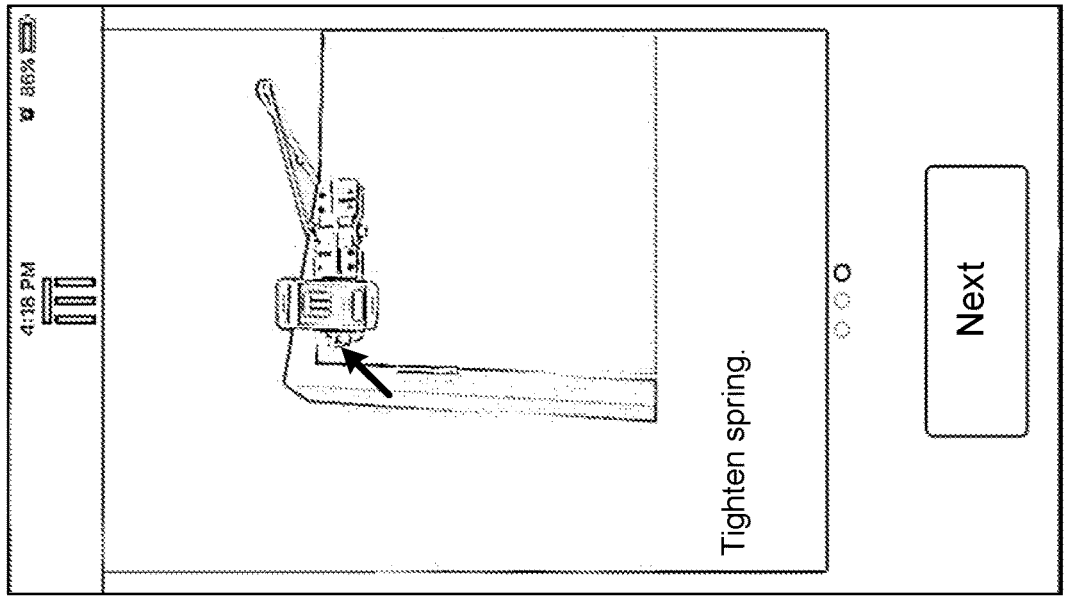
Figure 9:
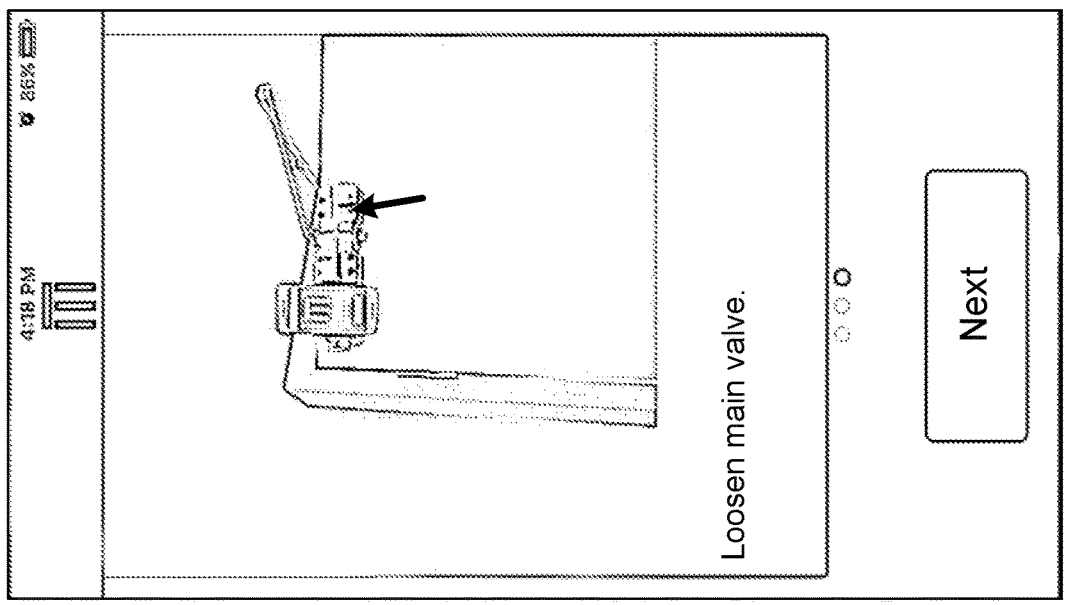
Figure 11:
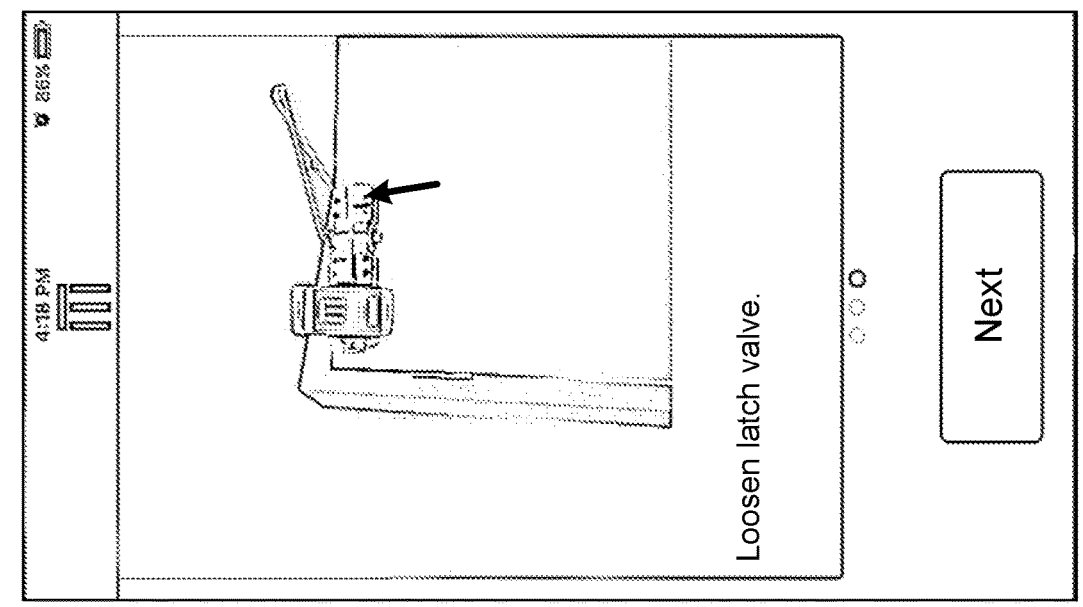

In block 506, the door closer diagnostics system 100 (e.g., the server 106 and/or the mobile device 102) determines whether there was any door movement, for example, based on the motion data generated by the sensor(s) of the mobile device 102. In other words, the door closer diagnostics system 100 determines whether a hold open door condition has been detected. If there is no door movement, the method 500 advances to block 508 in which the mobile device 102 instructs the technician to loosen the main valve and/or tighten the spring of the door closer 112. In particular, in some embodiments, the mobile device 102 may first instruct the technician to loosen the main valve (see, for example, screen capture 900 of FIG. 9) and, if the technician has already loosened the main valve, the mobile device 102 may instruct the technician to tighten the spring (see, for example, screen capture 1000 of FIG. 10). As shown in FIGS. 9-10, the installation instructions presented on the graphical user interface of the mobile device 102 may identify the location of the particular component to be adjusted (e.g., via an arrow or other suitable indicator). After making the adjustment, the method 500 returns to block 504 in which the mobile device 102 again instructs the technician to open and release the door 108 as the mobile device 12 records the motion data of the door 108.

If the door 108 has moved, the method 500 advances to block 510 in which the door closer diagnostics system 100 determines the duration the door 108 was in each of the door movement zones. For example, in the illustrative embodiment, the door closer diagnostics system 100 may determine the duration the door 108 was in the main zone ($T_{MAIN}$) and the duration the door 108 was in the latch zone ($T_{LATCH}$) as described above. In block 512, the door closer diagnostics system 100 determines whether the duration the door 108 was in the main zone ($T_{MAIN}$) is greater than a corresponding threshold time ($T_1$). That is, the door closer diagnostics system 100 determines whether $T_{MAIN} > T_1$. In some embodiments, the threshold time ($T_1$) is 7 seconds. If so, the method 500 advances to block 508 in which the mobile device 102 instructs the technician to loosen the main valve and/or tighten the spring of the door closer 112 as described above.

If the door 108 was not in the main zone for a duration greater than the corresponding threshold time ($T_1$), the method 500 advances to block 514 in which the door closer diagnostics system 100 determines whether the door 108 moved to the closed position. If not, the method 500 advances to block 508 in which the mobile device 102 instructs the technician to loosen the main valve and/or tighten the spring of the door closer 112 as described above. However, if the door 108 closed, the method 500 advances to block 516 of FIG. 6 in which the door closer diagnostics system 100 determines whether the duration the door 108 was in the main zone ($T_{MAIN}$) is greater than another corresponding threshold time ($T_2$), where $T_2 < T_1$. That is, the door closer diagnostics system 100 determines whether $T_{MAIN} > T_2$. In some embodiments, the threshold time ($T_2$) is 3.5 seconds. If so, the method 500 advances to block 518 in which the mobile device 102 instructs the technician to loosen the main valve of the door closer 112.

If the door 108 was not in the main zone for a duration greater than the corresponding threshold time ($T_2$), the method 500 advances to block 520 in which the door closer diagnostics system 100 determines whether the duration the door 108 was in the main zone ($T_{MAIN}$) is less than another corresponding threshold time ($T_3$), where $T_3 < T_2$. That is, the door closer diagnostics system 100 determines whether $T_{MAIN} < T_3$. In some embodiments, the threshold time ($T_3$) is 2.5 seconds. If so, the method 500 advances to block 522 in which the mobile device 102 instructs the technician to tighten the main valve of the door closer 112.

If the door 108 was not in the main zone for a duration less than the corresponding threshold time ($T_3$), the method 500 advances to block 524 in which the door closer diagnostics system 100 determines whether the duration the door 108 was in the latch zone ($T_{LATCH}$) is greater than another corresponding threshold time ($T_4$). If so, the method 500 advances to block 526 in which the mobile device 102 instructs the technician to loosen the latch valve of the door closer 112. It should be appreciated that the threshold time ($T_4$) may be based on the duration the door 108 was in the main zone ($T_{MAIN}$). In particular, in the illustrative embodiment, the threshold time ($T_4$) is proportional to the duration the door 108 was in the main zone ($T_{MAIN}$) such that $T_4 = (1+\alpha) \cdot T_{MAIN}$ where $\alpha > 0$. For example, in an embodiment in which $\alpha = 0.20$, the door closer diagnostics system 100 determines whether the duration the door 108 was in the latch zone ($T_{LATCH}$) is at least 20% greater than the duration the door was in the main zone ($T_{MAIN}$).

If the door 108 was not in the latch zone ($T_{LATCH}$) for a duration greater than the corresponding threshold time ($T_4$), the method 500 advances to block 528 in which the door closer diagnostics system 100 determines whether the duration the door 108 was in the latch zone ($T_{LATCH}$) is less than another corresponding threshold time ($T_5$). If so, the method 500 advances to block 530 in which the mobile device 102 instructs the technician to tighten the latch valve of the door closer 112. It should be appreciated that the threshold time ($T_5$) may be based on the duration the door 108 was in the main zone ($T_{MAIN}$). In particular, in the illustrative embodiment, the threshold time ($T_5$) is proportional to the duration the door 108 was in the main zone ($T_{MAIN}$) such that $T_5 = (1-\alpha) \cdot T_{MAIN}$ where $\alpha > 0$. For example, in an embodiment in which $\alpha = 0.20$, the door closer diagnostics system 100 determines whether the duration the door 108 was in the latch zone ($T_{LATCH}$) is at least 20% less than the duration the door was in the main zone ($T_{MAIN}$). After making the adjustment in any of blocks 518, 522, 526, 530, the method 500 returns to block 504 in which the mobile device 102 again instructs the technician to open and release the door 108 as the mobile device 12 records the motion data of the door 108.

If the door 108 was not in the latch zone ($T_{LATCH}$) for a duration less than the corresponding threshold time ($T_5$), the method 500 advances to block 532 in which the mobile device 102 notifies the technician of a successful installation (i.e., that no further adjustments are necessary). In other words, in the illustrative embodiment, no adjustments are necessary if the duration the door 108 was in the main zone ($T_{MAIN}$) is within the relevant main zone thresholds (i.e., $T_3 \leq T_{MAIN} \leq T_2$) and the duration the door 108 was in the latch zone ($T_{LATCH}$) is within the relevant latch zone thresholds (i.e., $(1-\alpha) \cdot T_{MAIN} \leq T_{LATCH} \leq (1+\alpha) \cdot T_{MAIN}$). It should be appreciated that the particular values of the thresholds may vary depending on the particular type of door closer 112, any relevant installation requirements/settings, and/or based on the particular embodiment.

While certain examples have been provided for the threshold times $T_1$-$T_5$, it is to be appreciated that other values may be utilized for the threshold times. In certain embodiments, one or more of the threshold times may correspond to selections made by the user. For example, in embodiments in which the user selects a close time of 10 seconds, the first threshold time $T_1$ may be 7 seconds, the second threshold time $T_2$ may be 3.5 seconds, the third threshold time $T_3$ may be 2.5 seconds. As noted above, the fourth threshold time $T_4$ and the fifth threshold time $T_5$ may be based upon the actual time that the door 108 spends in the main swing zone $T_{MAIN}$. In other embodiments, the fourth threshold time $T_4$ and the fifth threshold time $T_5$ may be preselected values that do not necessarily correspond to the main swing time $T_{MAIN}$.

Although the blocks 502-532 are described in a relatively serial manner, it should be appreciated that various blocks of the method 500 may be performed in parallel in some embodiments.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
removably mounting a mobile device having at least one sensor on a door or on a door closer attached to the door;
generating, by the at least one sensor, motion data indicative of motion of the door as the door is moved from an open position to a closed position;
analyzing the motion data to determine a duration the door was in each of a plurality of door movement zones between the open position and the closed position, wherein the plurality of door movement zones comprises a main zone and a latch zone, and wherein the analyzing the motion data comprises:
   determining a first duration of time the door was in the main zone; and
   determining a second duration of time the door was in the latch zone;
determining at least one amount of adjustment to the door closer for a successful installation of the door closer based on:
   the first duration of time the door was in the main zone; and
   the second duration of time the door was in the latch zone;
displaying at least one installation instruction on a graphical user interface, the at least one installation instruction corresponding to the at least one amount of adjustment to the door closer;
manually adjusting the door closer based on the at least one installation instruction; and
removing the mobile device from the door or the door closer.

2. The method of claim 1, wherein the at least one installation instruction is displayed on the mobile device removably mounted to the door or on the door closer.

3. The method of claim 1, further comprising displaying on the graphical user interface a notification indicative of a successful installation of the door closer in response to a determination that no adjustments to the door closer are necessary for the successful installation of the door closer.

4. The method of claim 1, wherein analyzing the motion data comprises (i) transmitting the motion data to a server and (ii) analyzing the motion data by the server to determine the duration the door was in each of the plurality of door movement zones; and
wherein determining the at least one amount of adjustment to the door closer comprises determining the at least one amount of adjustment by the server.

5. The method of claim 1, wherein the determining the at least one amount of adjustment to the door closer comprises at least one of:
determining an amount of adjustment to a main valve of the door closer;
determining an amount of adjustment to a latch valve of the door closer; or
determining an amount of adjustment to a spring of the door closer.

6. The method of claim 1, wherein the at least one sensor comprises a gyrometer.

7. The method of claim 1, further comprising normalizing the motion data prior to analyzing the motion data.

8. The method of claim 1, wherein analyzing the motion data comprises segmenting the motion data into a plurality of segments corresponding to the plurality of door movement zones.

9. The method of claim 1, wherein determining the at least one amount of adjustment to the door closer comprises determining an amount of adjustment to a latch valve of the door closer in response to a comparison of the second duration of time the door was in the latch zone with at least one threshold time; and
wherein the at least one threshold time is based on the first duration of time the door was in the main zone.

10. A method, comprising:
generating, by at least one sensor, motion data indicative of motion of a door having a door closer as the door is moved from an open position to a closed position;
analyzing the motion data to determine a duration the door was in each of a plurality of door movement zones between the open position and the closed position, wherein the plurality of door movement zones comprises a main zone and a latch zone, and wherein the analyzing the motion data comprises determining a first duration of time the door was in the main zone, and determining a second duration of time the door was in the latch zone;
determining at least one amount of adjustment to the door closer for a successful installation of the door closer based on the first duration of time the door was in the main zone, and the second duration of time the door was in the latch zone; and
manually adjusting the door closer based on the at least one amount of adjustment to the door closer.

11. The method of claim 10, further comprising displaying at least one installation instruction corresponding with the at least one amount of adjustment on a graphical user interface.

12. The method of claim 10, wherein the determining the at least one amount of adjustment to the door closer comprises determining the at least one amount of adjustment to the door closer based on at least one user-selected installation setting for the door closer.

13. The method of claim 10, further comprising positioning the at least one sensor on the door or on the door closer.

14. The method of claim 10, wherein the determining the at least one amount of adjustment to the door closer comprises at least one of:
determining an amount of adjustment to a main valve of the door closer;
determining an amount of adjustment to a latch valve of the door closer; or
determining an amount of adjustment to a spring of the door closer.

15. The method of claim 10, wherein analyzing the motion data comprises segmenting the motion data into a plurality of segments corresponding to the plurality of door movement zones.

16. A method, comprising:
positioning at least one sensor on a door or on a door closer attached to the door;
generating, by the at least one sensor, motion data indicative of motion of the door as the door is moved from an open position to a closed position;
analyzing the motion data to determine a duration the door was in each of a plurality of door movement zones between the open position and the closed position, wherein the plurality of door movement zones comprises a main zone and a latch zone, and wherein the analyzing the motion data comprises determining a first duration of time the door was in the main zone, and determining a second duration of time the door was in the latch zone; and determining at least one amount of adjustment to the door closer for a successful installation of the door closer based on the first duration of time the door was in the main zone, and the second duration of time the door was in the latch zone;

wherein the determining the at least one amount of adjustment to the door closer comprises determining to loosen a main valve of the door closer in response to determining the first duration the door was in the main zone is greater than a first threshold time;

wherein the determining the at least one amount of adjustment to the door closer comprises determining to tighten the main valve in response to determining the first duration the door was in the main zone is less than a second threshold time; and wherein the first threshold time is greater than the second threshold time.

17. A method, comprising:

generating, by at least one sensor, motion data indicative of motion of a door having a door closer as the door is moved from an open position to a closed position;

analyzing the motion data to determine a duration the door was in each of a plurality of door movement zones between the open position and the closed position, wherein the plurality of door movement zones comprises a main zone and a latch zone;

determining at least one amount of adjustment to the door closer for a successful installation of the door closer based on the duration the door was in each of the plurality of door movement zones, wherein determining the at least one amount of adjustment to the door closer comprises determining an amount of adjustment to a latch valve of the door closer in response to a comparison of the duration the door was in the latch zone with at least one threshold time, and wherein the at least one threshold time is based on the duration the door was in the main zone; and manually adjusting the door closer based on the at least one amount of adjustment to the door closer.

* * * * *